(12) United States Patent
Lan et al.

(10) Patent No.: US 12,174,619 B1
(45) Date of Patent: Dec. 24, 2024

(54) METHOD, MEDIUM, AND APPARATUS FOR INTELLIGENT MANAGEMENT OF VALVE PRODUCTION PROCESS DATA

(71) Applicant: Qingdao Elite Machinery Manufacture Co., Ltd., Qingdao (CN)

(72) Inventors: Chunjuan Lan, Qingdao (CN); Kun Song, Qingdao (CN); Hongwei Song, Qingdao (CN); Chenglong Li, Qingdao (CN); Jing Zhao, Qingdao (CN); Hao Jia, Qingdao (CN)

( * ) Notice: Subject to any disclaimer, the term of this patent is extended or adjusted under 35 U.S.C. 154(b) by 0 days.

(21) Appl. No.: 18/737,025

(22) Filed: Jun. 7, 2024

(30) Foreign Application Priority Data

Jun. 12, 2023 (CN) .......................... 202310686560.6

(51) Int. Cl.
  *G05B 19/418* (2006.01)
  *G06F 17/11* (2006.01)

(52) U.S. Cl.
  CPC .......... *G05B 19/4183* (2013.01); *G06F 17/11* (2013.01)

(58) Field of Classification Search
  None
  See application file for complete search history.

(56) References Cited

U.S. PATENT DOCUMENTS

| 8,166,035 | B2 * | 4/2012 | Tsai | ........................ G06F 18/23 707/737 |
| 2011/0055212 | A1 | 3/2011 | Tsai et al. | |
| 2011/0072016 | A1 * | 3/2011 | Tsai | ........................ G06F 16/35 707/E17.046 |
| 2012/0296905 | A1 * | 11/2012 | Tsai | ....................... G06F 16/285 707/E17.089 |
| 2012/0296906 | A1 * | 11/2012 | Tsai | ....................... G06F 16/285 707/E17.046 |
| 2014/0201126 | A1 * | 7/2014 | Zadeh | .................... A61B 5/165 706/52 |

FOREIGN PATENT DOCUMENTS

| CA | 2783089 A1 | 1/2014 | |
| CN | 209085657 U * | 7/2019 | ......... B62D 15/0215 |

(Continued)

OTHER PUBLICATIONS

CN209085657U translation (Year: 2019).*

(Continued)

*Primary Examiner* — Lina Cordero

(57) ABSTRACT

The present invention proposes a method for intelligent management of valve production process data, a medium, and an apparatus. Through results of grid classification of sampling points, the method constructs information entropy of grid distribution density levels as well as grid distribution density, which takes into account the circumstance that sampling points may not exist in the classification space, so as to avoid grids where sampling points do not exist from affecting the local density of the sampling points; secondly, based on the core relative distance of the sampling points in a seed grid, the method constructs a coverage density distance, which takes into account the magnitude of the local density of the sampling points in the seed grid as well as differences in the distance from sampling points that have a relatively large local density in the other seed grids.

3 Claims, 1 Drawing Sheet collecting signals of M assembled valves by using a signal collecting instrument, and applying denoising and discretization processing to the signals, to obtain signal sampling points applying grid classification to the signal sampling points, and constructing grid distribution density based on results of the grid classification; determining a seed grid according to the grid distribution density, constructing a coverage density distance based on a core relative distance of the sampling points in the seed grid, and screening core points from all the sampling points based on the coverage density distance obtaining key-value pairs that correspond to the core points according to the core points and the coverage density distance, and obtaining classification results of data by utilizing a clustering algorithm

(56) References Cited

FOREIGN PATENT DOCUMENTS

| CN | 110363767 | A | 10/2019 |
| CN | 111275099 | A | 6/2020 |
| CN | 111695482 | A | 9/2020 |
| CN | 113128617 | A | 7/2021 |
| CN | 114693670 | A | 7/2022 |

OTHER PUBLICATIONS

Translation of IDS reference CN111695482A (Year: 2020).*
Translation of IDS reference CN111275099A (Year: 2020).*
Yi Sanli et al., "OTSU Secondary Segmentation Algorithm Based on Information Entropy", Journal of Kunming University of Science and Technology ( Natural Science), vol. 44, No. 2, Apr. 15, 2019, entire document.

* cited by examiner collecting signals of M assembled valves by using a signal collecting instrument, and applying denoising and discretization processing to the signals, to obtain signal sampling points applying grid classification to the signal sampling points, and constructing grid distribution density based on results of the grid classification; determining a seed grid according to the grid distribution density, constructing a coverage density distance based on a core relative distance of the sampling points in the seed grid, and screening core points from all the sampling points based on the coverage density distance obtaining key-value pairs that correspond to the core points according to the core points and the coverage density distance, and obtaining classification results of data by utilizing a clustering algorithm

METHOD, MEDIUM, AND APPARATUS FOR INTELLIGENT MANAGEMENT OF VALVE PRODUCTION PROCESS DATA

CROSS-REFERENCE TO RELATED APPLICATIONS

The present application claims priority to Chinese Patent Application No. 202310686506.6, filed on Jun. 12, 2023, the entire disclosures of which are hereby incorporated by reference.

TECHNICAL FIELD

The present invention relates to the technical field of data processing, and specifically, to a method, a medium, and an apparatus for intelligent management of valve production process data.

BACKGROUND ART

A valve is a device widely used in such fields as industrial pipelines, municipal water supply, irrigation, ship construction, and fire-fighting systems to control fluid flow, pressure, and direction. The valve usually consists of such components as a valve body, a valve flap, and a valve stem.

The production process of the valve includes a number of links, such as material selection, processing, assembly, and quality detection. In the processing link, mechanical apparatuses are used for such operations on materials as cutting, welding, stamping, and grinding, to produce various parts of the valve. The assembling link includes installation and adjustment of components, such as the valve body, the valve flap, the valve stem, and seals. The two links, processing and assembling, have a direct influence on the quality of the valve, thus the vast majority of manufacturers in the course of production set up procedures of the quality detection. Quality inspectors observe and compare the appearance of the valve to detect whether there exist surface defects such as cracks and burrs; they measure the valve size, diameter, and aperture among others with measuring tools, such as calipers and altimeters; they make use of acoustic emissions inside the parts of the valve for acoustic detection, to detect internal quality problems of the valve. The existing valve process detection methods suffer from the following defects:

1. as the accuracy rate of the detection depends on the experience of the quality inspectors and the precision of instruments, there exist subjective factors and errors;
2. the detection takes a relatively long time, which affects the efficiency in the production of valves;
3. some surface defects, such as small cracks or burrs, cannot be detected through visual observation or with traditional measuring tools;
4. as the internal quality problems can only be detected by non-destructive testing means, such as acoustic detection, there is a limit of detection.

Therefore, the above detection methods have an accuracy rate dependent on the experience of the quality inspectors and the precision of the instruments, and need a relatively long detection time, thereby affecting the efficiency in the production of valves.

CONTENTS OF THE INVENTION

To achieve the above purposes, the present invention discloses a method for intelligent management of valve production process data, which can solve quality problems and problems of long detection time and low efficiency existing in the links of processing, assembling and the like in the production of valves, and improve the quality and efficiency in the production of valves. At the same time, by collecting, analyzing, and mining data in the production course of the valve, one can realize comprehensive monitoring and intelligent management of the production course of the valve, help enterprises realize informationalized and intelligent production management, and improve the competitiveness and profitability of the enterprises.

According to an aspect of the present invention, a method for intelligent management of valve production process data is provided, which comprises the following steps:

collecting signals of M assembled valves by using a signal collecting instrument, and applying denoising and discretization processing to the signals, to obtain signal sampling points;

applying grid classification to the signal sampling points, and constructing grid distribution density based on results of the grid classification; determining a seed grid according to the grid distribution density, constructing a coverage density distance based on the core relative distance of the sampling points in the seed grid, and screening core points from all the sampling points based on the coverage density distance;

obtaining key-value pairs that correspond to the core points according to the core points and the coverage density distance, and obtaining classification results of data by utilizing a clustering algorithm.

Further, in the above method for intelligent management of valve production process data, the signal collecting instrument comprises a vibration signal sensor, an ultrasonic detector, and a pressure sensor.

Further, in the above method for intelligent management of valve production process data, said collecting signals of M assembled valves by using a signal collecting instrument and applying denoising and discretization processing to the signals to obtain signal sampling points comprises: the signals comprising ultrasonic signals, vibration signals, and pressure signals; obtaining the signal sampling points by discretizing the ultrasonic signals, vibration signals, and pressure signals at a sampling frequency twice the frequency of the ultrasonic signals; the signal sampling points comprising discrete acoustic signals, discrete vibration signals, and discrete pressure signals.

Further, in the above method for intelligent management of valve production process data, said applying grid classification to the signal sampling points and constructing grid distribution density based on results of the grid classification comprises: constructing grid distribution density L for representing the magnitude of the local density of the sampling points in each grid area, and calculating the grid distribution density $L_i$ of the i-th grid:

$$l_i = \frac{N(k_1(n_i) \cap k_2(g_i))}{N}$$

$$H = -\sum_{r=1}^{R} p(r)\log p(r)$$

$$L_i = \frac{l_i}{l} \cdot H$$

Wherein, $l_i$ is distribution density of the i-th grid, N is the total number of grids where sampling points exist, $n_i$ is the number of sampling points in the i-th grid, $k_1(n_i)$ is a set of grids where the number of sampling points is equal to $n_i$ in N grids, $g_i$ is distribution variance of amplitude values of the sampling points at the j-th attribute in the i-th grid, $k_2(g_i)$ is a set of grids where the distribution variance of the amplitude values of the sampling points at the j-th attribute is equal to $g_i$ in N grids, $k_1(n_i) \cap k_2(g_i)$ is an intersection of the two sets, and $N(k_1(n_i) \cap k_2(g_i))$ is the number of grids in the intersection of the two sets; H is information entropy of N grid distribution density levels; as the grid distribution density of all grids is calculated, those with same grid distribution density share a distribution density level; the maximum value and the minimum value of the grid distribution density of N grids are $l_{max}$ and $l_{min}$, respectively; in this case, the grid distribution density level corresponding to $l_{min}$ is recorded as the first level, the grid distribution density level corresponding to $l_{max}$ is recorded as the R-th level, $\rho(r)$ is probability of the r-th level of the grid distribution density levels, which probability is equal to the ratio of the number of grids with the grid distribution density level r to the total number of grids N, and $\bar{I}$ is an average value of the distribution density of N grids.

Said constructing a coverage density distance comprises: constructing a coverage density distance C for representing how far each data point in each seed grid is from becoming a non-core point, and calculating a coverage density distance $c_{ix}$ of a sampling point x in a seed grid i:

$$D_{xy} = \sum_{t=1}^{n_1} X(G, t) \cdot d(x_t, y_t)$$

$$\rho_{ix} = \frac{1}{n_2} \cdot \sum_{y=1}^{n_2} \frac{D_{max}(i)}{D_{xy} + \varphi_i}$$

$$c_{ix} = \frac{\rho_{ix} - \rho_{max}(i)}{\sum_{b=1}^{N} \rho_{ix} - \rho_{max}(b)}$$

$$C_{ix} = e^{-c_{ix}}$$

Wherein, $D_{xy}$ is a grid distance between sampling points x and y obtained based on information gain and the grid distribution density, X(G, t) is the information gain of dimension t, G is a set of amplitude values of all dimensions of all sampling points, $n_1$ is the number of dimensions, $d(x_t, y_t)$ is an Euclidean distance between two sampling points on the amplitude value of the dimension t; $\rho_{ix}$ is grid local density of a sampling point x, $n_2$ is the number of sampling points in the i-th grid, y is the y-th sampling point in the i-th grid, $D_{max}(i)$ is the maximum value of the grid distance in the i-th grid, $\varphi_1$ is a tuning factor, $C_{ix}$ is core relative distance of the sampling point x, N is the number of grids where sampling points exist, and $\rho_{max}(i)$ and $\rho_{max}(b)$ are the maximum values of the grid local density in the i-th grid and the b-th grid, respectively.

Further, in the above method for intelligent management of valve production process data, said determining a seed grid according to the grid distribution density comprises: obtaining the grid distribution density of each grid, obtaining a segmentation threshold by using an Otsu algorithm, and determining a grid with a grid distribution density greater than the segmentation threshold as the seed grid.

Further, in the above method for intelligent management of valve production process data, said screening core points from all the sampling points based on the coverage density distance comprises: recording the maximum value of the coverage density distance as $C_{max}$, obtaining the sampling points that correspond to the maximum value of the coverage density distance in each grid, excluding the sampling points less than a screening threshold of $0.8C_{max}$, and taking the remaining sampling points as the core points.

Further, in the above method for intelligent management of valve production process data, said obtaining key-value pairs that correspond to the core points according to the core points and the coverage density distance and obtaining classification results of data by utilizing a clustering algorithm comprises: obtaining the coverage density distance of each core point based on the core points, forming key-value pairs by using each core point and the coverage density distance corresponding thereto, and using the key-value pairs in an OPTICS clustering algorithm to obtain an ordered list decision map of data, so as to realize the intelligent management of valve production process data.

According to another aspect of the present invention, a computer-readable storage medium is provided, on which medium a computer program is stored, wherein the steps of the method for intelligent management of valve production process data as mentioned above are realized when the computer program is executed.

According to another aspect of the present invention, a computer apparatus is provided, which comprises a processor, a memory, and a computer program stored on the memory, wherein the steps of the method for intelligent management of valve production process data as mentioned above are realized when the processor executes the computer program.

The present invention provides a method for intelligent management of valve production process data, which utilizes a signal collecting instrument to collect signals in the assembling course of the valve, and realizes the intelligent management of valve production process data through steps of denoising and discretization processing, grid classification, coverage density distance calculation, core point screening, and clustering algorithm among others. Compared with traditional methods, the present method has the following advantages:

High efficiency: by adopting techniques such as denoising and discretization processing, the present method effectively reduces data noise and redundancy, and improves the accuracy and stability of the sampling points. At the same time, by utilizing the grid classification and coverage density distance calculation, the clustering relationship between data points can be described more accurately, and the accuracy and stability of clustering results can be improved. Therefore, the present method can obtain data classification results more quickly and more accurately, and improve the efficiency of data processing.

Flexibility: the present method can not only be applied to the management of valve production process data, but also can be extended and applied to the management of process data in other fields. The reason is that the present method adopts a general data processing method based on the grid classification and coverage density distance calculation, can be optimized and improved according to needs in different fields, and is flexibly adapted to different data characteristics and production needs.

Stability: the present method adopts such techniques as grid classification and coverage density distance calculation, which can reduce data noise and redundancy, and improve the stability of data processing. Meanwhile, the application of the core point screening and clustering algorithm can obtain classification results of data more quickly, and further improve the stability of data processing.

Reliability: the present method employs a number of technical means, such as denoising and discretization processing, grid classification, and coverage density distance calculation, which can more accurately describe the clustering relationship between data points, and improve the reliability of data processing. At the same time, the application of the clustering algorithm can also classify the data more accurately, and further improve the reliability of data processing.

Practicality: the present method has a wide range of application prospects and promotion value, and can be applied to the intelligent management of data in other fields, such as industrial manufacturing and logistics distribution. This provides a new idea and method for data management, and has good application effects in improving the production efficiency, reducing the production costs, and improving the product quality.

Specifically, through the grid classification results of the sampling points, a method for intelligent management of valve production process data proposed in the present invention constructs information entropy of grid distribution density levels as well as grid distribution density, which takes into account the circumstance that sampling points may not exist in the classification space, so as to avoid grids where sampling points do not exist from affecting the local density of the sampling points, and improve the accuracy of the subsequent grid classification; secondly, based on the core relative distance of the sampling points in a seed grid, the method constructs a coverage density distance, which takes into account the magnitude of the local density of the sampling points in the seed grid as well as differences in the distance from sampling points that have a relatively large local density in the other seed grids, eliminates errors in regional comparison when a large number of sampling points corresponding to the assembled valve with leaks exist in the seed grid, and improves the accuracy in the subsequent screening of normal core points, thereby improving the management efficiency of the valve production process data.

DESCRIPTION OF FIGURES

The drawings, which are incorporated into the description and form a part of the description, illustrate the embodiments of the present invention, and are used in combination with the related descriptive text to explain the principle of the present invention. In these drawings, similar reference signs are used to denote similar elements. The drawings described below relate to some embodiments of the present invention, rather than all the embodiments. Without creative labor, persons skilled in the art can obtain other drawings from these drawings.

FIG. 1 is a flow chart of a method for intelligent management of valve production process data provided in an embodiment of the present invention.

MODE OF CARRYING OUT THE INVENTION

To make clearer the purposes, technical solutions, and advantages of the embodiments of the present invention, the technical solutions in the embodiments of the present invention will be described in a clear and complete manner in combination with the drawings in the embodiments of the present invention. Apparently, the described embodiments are some of the embodiments of the present invention, rather than all the embodiments. Based on the embodiments in the present invention, all other embodiments that persons skilled in the art obtain without creative labor fall within the scope of protection of the present invention. It should be noted that, without conflicts, the embodiments in the present application and the features in the embodiments can be combined with each other arbitrarily.

The existing valve process detection methods suffer from the following defects:
1. as the accuracy rate of the detection depends on the experience of the quality inspectors and the precision of instruments, there exist subjective factors and errors;
2. the detection takes a relatively long time, which affects the efficiency in the production of valves;
3. some surface defects, such as small cracks or burrs, cannot be detected through visual observation or with traditional measuring tools;
4. as the internal quality problems can only be detected by non-destructive testing means, such as acoustic detection, there is a limit of detection.

To solve the above problems, the embodiment of the present invention proposes a method of using advanced signal collecting and processing technology in combination with grid classification and coverage density distance calculation to realize intelligent management of valve production process data. By using the clustering algorithm to classify the collected data, the real-time monitoring and control of the production course of the valve is realized, the production efficiency and quality stability are improved, and the production costs and manpower investment are reduced. In addition, the present invention also possesses universality and expansibility, and can be applied to data management in other process courses.

An embodiment of the present invention provides a method for intelligent management of valve production process data, as shown in FIG. 1, comprising:

S1: collecting signals of M assembled valves by using a signal collecting instrument, and applying denoising and discretization processing to the signals, to obtain signal sampling points;

Assembling the valve is a crucial step in the entire valve production process. Once additional leaks occur between the components in the course of assembling the valve, the quality of the assembly and connection between the components of the valve affects the subsequent production process.

In the embodiment of the present invention, the assembled valve is used as the detection object, and vibration signals, ultrasonic signals, and pressure signals of each assembled valve are collected by using a vibration signal sensor, an ultrasonic detector, and a pressure sensor, respectively. The vibration, ultrasonic, and pressure signals of the valve as collected by the above three sensors can be used to detect a plurality of performance indicators of the valve, so as to improve the efficiency and accuracy in the quality detection of the valve. Specifically, the vibration signal sensor can be used to detect the vibration situations of the valve, including vibration frequency, vibration amplitude, vibration waveform among others, to further determine the stability and reliability of the valve. The ultrasonic detector can be used to detect quality problems inside the valve, such as cracks and holes, so as to avoid defects that cannot be detected through visual detection alone. The pressure sensor can be used to detect the sealing performance and flow control performance of the valve, and can measure changes in the flow and pressure, which correspond to the opening degree of the valve, so as to determine whether the performances of the valve meet the requirements. The introduction of these signal collecting instruments can greatly improve the efficiency and accuracy of the quality detection of the valve, reduce the reliance on the manual detection, and decrease the detection time and labor costs, thereby enhancing the efficiency and stability in the production of valves.

For example, the ultrasonic detector is used to collect ultrasonic signals at the joints of components of each assembled valve. To eliminate the influence of environmental noise, it is necessary to denoise the collected ultrasonic signals. In one embodiment of the present invention, the wavelet denoising technology is used to preprocess the collected ultrasonic signals, and the preprocessing has multiple beneficial effects. Firstly, the technology can effectively reduce noise, remove scrambled noise from the ultrasonic signals, improve the signal-to-noise ratio, and make the subsequent signal processing more accurate and more reliable. Secondly, the main information of the signals can be better preserved by using the wavelet denoising technology, so as to avoid the common problem of signal distortion in other traditional denoising methods. In addition, the wavelet denoising technology can also make adjustment according to different signal characteristics, and therefore has a better denoising effect on complex signals and improves the capabilities of signal analysis, processing, and recognition. Finally, the signal processing time can be greatly shortened by using the wavelet denoising technology, so as to improve the signal processing efficiency, and make the preprocessing of the ultrasonic signals more automated and more efficient.

Since the interference from environmental noise is relatively significant in the course of assembling the valve and the ultrasonic signals generated by leaks are relatively weak, the present invention utilizes a power amplifier to amplify the denoised ultrasonic signals. Further, to discretize the preprocessed ultrasonic signals, the embodiment of the present invention uses a sampling signal with a magnitude twice the frequency of the ultrasonic signals, records the discretized ultrasonic signals as discrete acoustic signals, and records the number of sampling points after the ultrasonic signals of each assembled valve are discretized as N. The vibration signals and the pressure signals of the assembled valve are processed at the same sampling frequency to obtain the corresponding discrete vibration signals and discrete pressure signals, that is, each sampling point corresponds to three signal amplitude values. The number of assembled valves as collected is recorded as M. At this point, multiple discrete signals corresponding to M assembled valves are obtained.

After obtaining multiple discrete signals corresponding to M assembled valves, machine learning algorithms can be used to train and analyze these signals, so as to more accurately detect the quality problems of the valves. Regarding three discrete signals of each assembled valve, they can be combined into a three-dimensional vector to form a training dataset. Various machine learning algorithms can be used, such as support vector machines, decision trees, and neural networks, and these vectors are trained and classified to detect whether there exist quality problems in the valves, including surface defects such as cracks and burrs, or internal quality problems such as valve leakage and unstable pressure.

By using the machine learning algorithms to analyze the discrete signals, the accuracy of the detection can be improved, and the detection can be carried out automatically, which greatly improves the efficiency in the production of valves. Compared with traditional quality detection methods, this technical solution can detect the quality problems of valves more quickly and more accurately, and can effectively reduce human errors and improve the overall quality level of the production of valves.

S2: applying grid classification to the signal sampling points, and constructing grid distribution density based on results of the grid classification; determining a seed grid according to the grid distribution density, constructing a coverage density distance based on the core relative distance of the sampling points in the seed grid, and screening core points from all the sampling points based on the coverage density distance;

Leaks are generated in the course of assembling components after valve machining, and may appear at different positions of the assembled valve. In other words, the positions of the internal leaks are not fixed, thus ultrasonic reflection results are also different, and the amplitude values of the corresponding sampling points will fluctuate within a range. Besides, when the distance from the leaks is constant, the amplitude values of the discrete signals will be different since the leak areas have different sizes. For example, the leaks in two assembled valves are caused by the same component, that is, the positions of the two leaks in the assembled valves are the same; the peak value of the amplitude value of the ultrasonic signal in the larger leak area will be smaller than peak value of the amplitude value of the ultrasonic signal in the smaller leak area. If the size of the leak area remains unchanged, then the amplitude values of the corresponding sampling points will also increase as the depth of the leak increases.

In the embodiment of the present invention, a CLIQUE grid clustering algorithm is used to divide the sampling points of M assembled valves into different grids. The CLIQUE grid clustering algorithm is an efficient data clustering algorithm that can divide data points into different grids. In the embodiment of the present invention, the CLIQUE grid clustering algorithm is used to divide the sampling points of the discrete signals of M assembled valves into different grids. In order to ensure the accuracy and efficiency of clustering, the embodiment of the present invention sets the number of cells in each dimension to 7 and sets the density threshold to 0.5. As the dimension increases, the sampling points will gradually be divided into different grids. The reason is that the amplitude values of different sampling points in the three dimensions are different. Therefore, if the more sampling points are present in a grid, which indicates that the values of each attribute of the sampling points in the grid are very close, the higher the local density of the sampling points in this grid; the total number of grids is recorded as N, wherein the first grid refers to a grid with spatial coordinates (1,1,1). The smaller the number of sampling points in the grid, which indicates the lower the local density of the sampling points in the grid, the more likely it is to correspond to the leak area inside the assembled valve; the greater the number of sampling points in the grid, which indicates that the higher the local density of the sampling points in the grid, the more likely it is to correspond to the normal area in the assembled valve.

Based on the above analysis, grid distribution density L is constructed herein to represent the magnitude of the local density of the sampling points in each grid area, and the grid distribution density of the i-th grid is calculated:

$$l_i = \frac{N(k_1(n_i) \cap k_2(g_i))}{N}$$

$$H = -\sum_{r=1}^{R} p(r)\log p(r)$$

$$L_i = \frac{l_i}{\bar{l}} \cdot H$$

In the formula, $l_i$ is the distribution density of the i-th grid, N is the total number of grids where sampling points exist, $n_i$ is the number of sampling points in the i-th grid, $k_1(n_i)$ is a set of grids where the number of sampling points is equal to $n_i$ in N grids, $g_i$ is distribution variance of amplitude values of the sampling points at the j-th attribute in the i-th grid, $k_2(g_i)$ is a set of grids where the distribution variance of the amplitude values of the sampling points at the j-th attribute is equal to $g_i$ in N grids, $k_1(n_i) \cap k_2(g_i)$ is an intersection of the two sets, and $N(k_1(n_i) \cap k_2(g_i))$ is the number of grids in the intersection of the two sets; the greater the value of $l_i$, the closer the distribution density of the sampling points in the i-th grid to the distribution density obtained by normal sampling points.

H is information entropy of N grid distribution density levels; as the grid distribution density of all grids is calculated, those with same grid distribution density share a distribution density level; for example, the maximum value and the minimum value of the grid distribution density of N grids are $l_{max}$ and $l_{min}$, respectively; in this case, the grid distribution density level corresponding to $l_{min}$ is recorded as the first level, the grid distribution density level corresponding to/max is recorded as the R-th level, and $\rho(r)$ is probability of the r-th level of the grid distribution density levels, which probability is equal to the ratio of the number of grids with the grid distribution density level r to the total number of grids N.

$\bar{l}$ is an average value of the distribution density of N grids.

The grid distribution density reflects the magnitude of the local density of sampling points in each grid area. The more grids in the grid with sampling points have the same number of sampling points as the i-th grid, the more similar the distribution of sampling points, and the larger the value of $N(k_1(n_i) \cap k_2(g_i))$, i.e., the larger the value of $l_i$, the closer the distribution density of sampling points in the i-th grid is to the distribution density obtained by normal sampling points; the greater the mean value of the grid distribution density of the i-th grid relative to the grid distribution density, i.e., the greater the value of $l_i/\bar{l}$, the more likely the sampling points in the i-th grid are to be normal sampling points with relatively large distribution density after classification. In other words, the larger the value of $L_i$, the greater the mean value of the local density of the sampling points in the i-th grid, and the more likely it is to be a grid where normal sampling points are clustered. Traditional grid classification methods usually only consider the number of sampling points in the grid, while ignoring changes in the grid distribution density. The embodiment of the present invention considers the changes in the grid distribution density by constructing the information entropy of grid distribution density levels and the grid distribution density, which can more accurately reflect the distribution of classification results, thereby improving the accuracy of grid classification. This classification model not only considers the circumstance that there may be no sampling points in the grid in the classification space, which avoids grids where sampling points do not exist from affecting the local density of the sampling points, but also improves the management efficiency of valve production process data.

Through the operation of this algorithm, the density inside each grid can be obtained, and the seed grid can be determined based thereon. By obtaining the grid distribution density of each grid and then obtaining a segmentation threshold by use of an Otsu algorithm, grids with a grid distribution density greater than the segmentation threshold are labeled as seed grids, and grids with a grid distribution density less than the segmentation threshold are labeled as edge grids. In the embodiment of the present invention, the Otsu algorithm has the following beneficial effects: firstly, the Otsu algorithm is a histogram-based self-adaptive threshold segmentation method, which can determine the optimal threshold according to characteristics of an image per se and has relatively high segmentation accuracy; secondly, by recording grids with a distribution density greater than the segmentation threshold as seed grids, the Otsu algorithm can bring high-density sampling points together, thereby improving the contrast of data and facilitating subsequent analysis and processing; finally, the Otsu algorithm has a certain degree of robustness to changes in noise and image brightness, can process some complex image segmentation problems, and is suitable for practical engineering applications.

At this point, the edge grids and the seed grids corresponding to the collected data are obtained. In summary, by using the CLIQUE grid clustering algorithm and Otsu algorithm, the sampling points of M assembled valves can be classified into grids, and the seed grids can be determined according to the grid distribution density. This can effectively classify and analyze a large number of discrete signals, thereby quickly and accurately identifying faults or abnormalities. Meanwhile, by using the Otsu algorithm to obtain the segmentation threshold, the grid classification can be carried out automatically, which improves the classification efficiency and reduces the possibility of human errors.

Then, in the embodiment of the present invention, the coverage density distance is constructed based on the core relative distance of the sampling points in the seed grid, and core points in all sampling points are screened according to the obtained coverage density distance.

Each sampling point contains a discrete vibration signal, a discrete pressure signal, and a discrete acoustic signal. If the sampling point corresponds to an assembled valve with a leak, the amplitude values of the three discrete signals of the sampling point will differ from those of a normal sampling point. However, due to differences in the depth and size among others of the leak, the fluctuation degree of the amplitude values of the three discrete signals may be different. Therefore, when calculating the distance between two sampling points, it is necessary to consider assigning different weights to each discrete signal, so that the distance between the two sampling points is more in line with the actual situation of the leak.

The information gain corresponding to each dimension is obtained by using the information gain algorithm, respectively. The larger the information gain, which indicates the higher the accuracy in segmenting the sampling points by using the dimension, the larger the weight of the dimension should be for measuring two sampling points. The information gain algorithm is a well-known technique, and the specific course will not be repeated. Therefore, based on the information gain and the grid distribution density, the grid distance Dry between sampling points x and y is obtained:

$$D_{xy} = \sum_{t=1}^{n_1} X(G, t) \cdot d(x_t, y_t)$$

In the formula, X(G, t) is the information gain of dimension t, G is a set of amplitude values of all dimensions of all sampling points, and m is the number of dimensions. In the present invention, the value of mi is an empirical value of 3, and d($x_t$, $y_t$) is an Euclidean distance between two sampling points on the amplitude value of the dimension t.

If the sampling point is a normal sampling point, then its difference from other sampling points in amplitude values of various dimensions is very small, that is, the grid distance between normal sampling points is relatively small, which ends up with a relatively high density in the same grids. Generally, these grids are seed grids. Whereas, the grid distance between sampling points in edge grids varies, because in the edge grid, there may be sampling points corresponding to an assembled valve with a leak. Therefore, if a certain sampling point in the seed grid has a relatively high local density and is relatively great in distance from sampling points with the maximum values of the local density in the other seed grids, the probability that this sampling point is a core point will be high. In this way, the screening of core points alone in the seed grid will greatly improve the subsequent detection efficiency.

Based on the above analysis, a coverage density distance C is constructed herein, to represent how far each data point in each seed grid is from becoming a non-core point, and the coverage density distance $c_{ix}$ of a sampling point x in a seed grid i is calculated:

$$\rho_{ix} = \frac{1}{n_2} \cdot \sum_{y=1}^{n_2} \frac{D_{max}(i)}{D_{xy} + \varphi_i}$$

$$c_{ix} = \frac{\rho_{ix} - \rho_{max}(i)}{\sum_{b=1}^{N} \rho_{ix} - \rho_{max}(b)}$$

$$C_{ix} = e^{-c_{ix}}$$

In the formula, pix is grid local density of a sampling point x, $n_2$ is the number of sampling points in the i-th grid, y is the y-th sampling point in the i-th grid, $D_{xy}$ is grid distance between sampling points x and y, $D_{max}(i)$ is the maximum value of the grid distance in the i-th grid, and $\varphi_1$ is a tuning factor. $\varphi_1$ serves to prevent the denominator from being 0, and the value of $\varphi_1$ is an empirical value of 0.01. The larger the value of $\rho_{ix}$, the smaller the distance between the sampling point x and the other sampling points, and the greater the possibility that the sampling point x is located in the clustering central area of the i-th grid.

$c_{ix}$ is core relative distance of the sampling point x, N is the number of grids where sampling points exist, and $\rho_{max}(i)$ and $\rho_{max}(b)$ are the maximum values of the grid local density in the i-th grid and the b-th grid, respectively. The larger the value of $c_{ix}$, the farther the distance between the sampling point x and the core point in the grid where it is located.

The coverage density distance reflects how far each data point in the seed grid is from becoming a non-core point. The greater the possibility that the sampling point x serves as the core point in the i-th grid, the smaller the distance between the sampling point x and the other sampling points, the greater the value of $D_{max}(i)/D_{xy+\varphi_1}$, and the greater the value of pix; the smaller the difference between the sampling point x and the maximum value of the grid local density in the i-th grid, the smaller the value of $\rho_{ix}-\rho_{max}(i)$, and the smaller the distance between the sampling point x and the core point in the i-th grid; the greater the difference between the sampling point x and the maximum value of the local density in the other grids, the greater the value of $\sum_{b=1}^{N}\rho_{ix}-\rho_{max}(b)$, that is, the greater the value of $c_{ix}$, the higher the distribution density of the sampling point x in the i-th grid area, and there are a large number of sampling points of the same type as the sampling point x. The coverage density distance takes into account the magnitude of the local density of sampling points in the seed grid and the difference in distance from sampling points with a relatively high local density in the other seed grids, eliminates errors in regional comparison when a large number of sampling points corresponding to assembled valves with leaks exist in the seed grid, and improves the accuracy in the subsequent screening of normal core points.

In other words, the coverage density distance is constructed based on the core relative distance of the sampling points in the seed grid, which eliminates errors in regional comparison in the presence of sampling points that correspond to assembled valves with leaks, and improves the accuracy in the subsequent screening of normal core points. Traditional methods are prone to errors in regional comparison in the presence of sampling points that correspond to assembled valves with leaks, which can decrease the accuracy in the subsequent screening of normal core points. The embodiment of the present invention adopts a method of constructing the coverage density distance based on the core relative distance of the sampling points in the seed grid, which eliminates errors in regional comparison in the presence of sampling points that correspond to assembled valves with leaks, and improves the accuracy in the subsequent screening of normal core points. This method can not only improve the management efficiency of valve production process data, but also avoid leaky assembly from affecting the local density of the sampling points.

In the embodiment of the present invention, the coverage density distance of each sampling point in all seed grids is calculated separately, and the maximum value of the coverage density distance is recorded as $C_{max}$. Then, the sampling points corresponding to the maximum value of the coverage density distance in each grid are obtained. If there are multiple sampling points with the maximum value of the coverage density in a grid, any one of them can be selected. The sampling points smaller than the filtering threshold $0.8C_{max}$ are removed, and the remaining sampling points are used as the core points. At this point, the core points among all sampling points are obtained.

In the embodiment of the present invention, the coverage density distance is constructed based on the core relative distance of the sampling points in the seed grid, which eliminates errors in regional comparison in the presence of sampling points that correspond to assembled valves with leaks, and improves the accuracy in the subsequent screening of normal core points. Traditional methods are prone to errors in regional comparison in the presence of sampling points that correspond to assembled valves with leaks, which can decrease the accuracy in the subsequent screening of normal core points. The embodiment of the present invention adopts a method of constructing the coverage density distance based on the core relative distance of the sampling points in the seed grid, which eliminates errors in regional comparison in the presence of sampling points that correspond to assembled valves with leaks, and improves the accuracy in the subsequent screening of normal core points. This method can not only improve the management efficiency of valve production process data, but also avoid leaky assembly from affecting the local density of the sampling points.

S3: obtaining key-value pairs that correspond to the core points according to the core points and the coverage density distance, and obtaining classification results of data by utilizing a clustering algorithm.

Next, the clustering algorithm is used to classify the data. Specifically, the embodiment of the present invention utilizes the core points and the coverage density distance to obtain key-value pairs corresponding to the core points, and then these key value pairs are input into the clustering algorithm to obtain classification results of the data.

In the embodiment of the present invention, the coverage density distance of each core point is obtained based on the core points, each core point and the coverage density distance corresponding thereto form key-value pairs, and the key-value pairs are then used in an OPTICS clustering algorithm to obtain an ordered list decision map of data, so as to realize the intelligent management of valve production process data. That is to say, after obtaining the core points according to Step S2 as mentioned above, the coverage density distance of each core point is obtained, respectively; key-value pairs composed of each core point and the coverage density distance corresponding thereto are used as the key-value pairs corresponding to the core points in the OPTICS clustering algorithm; sorted results of the coverage density distance of each core point from smallest to biggest are used as the sorted results of the reachable distance of the core points in the OPTICS clustering algorithm; secondly, the OPTICS clustering algorithm is used to obtain the ordered list decision map corresponding to the collected data; the OPTICS clustering algorithm, as a density-based clustering algorithm, can effectively process clusters with irregular shapes and sizes, without specifying the number of clusters in advance, and can automatically identify the clustering structure in the data, thereby possessing better flexibility; moreover, it can discover clusters in arbitrary shapes, and can identify noise points and reduce interference with clustering; moreover, by generating the ordered list decision map, clustering results can be visually observed, and the subsequent analysis and processing can be carried out, so as to realize the intelligent management of valve production process data.

In the embodiment of the present invention, by using the coverage density distance in Step S2 to screen the core points, a high-quality set of core points can be obtained. These core points can be used to construct key-value pairs in the OPTICS clustering algorithm. In Step S3, by using the key-value pairs composed of each core point and the coverage density distance corresponding thereto as the key-value pairs corresponding to the core points in the OPTICS clustering algorithm, the OPTICS clustering algorithm can be used to cluster the data, so as to realize the classification and analysis of the sampling points of assembled valves. By using the sorted results of the coverage density distance of each core point from smallest to biggest as the sorted results of the reachable distance of the core points in the OPTICS clustering algorithm, the clustering analysis can be carried out more effectively. Meanwhile, by generating the ordered list decision map, the clustering results can be visually observed, which improves the accuracy and efficiency of data analysis, and makes the results of data analysis more reliable and more practical.

An embodiment of the present invention further provides a computer-readable storage medium, on which a computer program is stored, wherein the steps of the method for intelligent management of valve production process data as mentioned above are realized when the computer program is executed.

An embodiment of the present invention further provides a computer apparatus, which comprises a processor, a memory, and a computer program stored on the memory, wherein the steps of the method for intelligent management of valve production process data as mentioned above are realized when the processor executes the computer program.

Through results of grid classification of sampling points, the method for intelligent management of valve production process data as proposed in the embodiment of the present invention constructs information entropy of grid distribution density levels as well as grid distribution density, which takes into account the circumstance that sampling points may not exist in the classification space, so as to avoid grids where sampling points do not exist from affecting the local density of the sampling points, and improve the accuracy of the subsequent grid classification; secondly, based on the core relative distance of the sampling points in a seed grid, the method constructs a coverage density distance, which takes into account the magnitude of the local density of the sampling points in the seed grid as well as differences in the distance from sampling points that have a relatively large local density in the other seed grids, eliminates errors in regional comparison when a large number of sampling points corresponding to assembled valves with leaks exist in the seed grid, and improves the accuracy in the subsequent screening of normal core points. Overall, the present invention can improve the accuracy of grid classification, eliminate the impact of leaky assembly on the local density of sampling points, thereby improving the management efficiency of valve production process data, which is of great practical value.

The above illustrations are only embodiments of the present invention, and does not limit the scope of the patent of the present invention. Any equivalent structure or equivalent flow transformation that are made by using the description and drawings of the present invention, or direct or indirect application in other related technical fields, falls within the scope of patent protection of the present invention for the same reasons.

What is claimed is:

1. A method for determining a qualified valve, the method comprising
    collecting signals of M assembled valves by using a signal collecting instrument, and applying denoising and discretization processing to the signals, to obtain signal sampling points;
    wherein the signal collecting instrument comprises a vibration signal sensor, an ultrasonic detector, and a pressure sensor; the signals comprise an ultrasonic signal, a vibration signal, and a pressure signal; and the signal sampling points comprise a discrete acoustic signal, a discrete vibration signal, and a discrete pressure signal;
    wherein applying the denoising and discretization processing to the signals, to obtain the signal sampling points comprises:
    using a wavelet denoising technology to denoise the ultrasonic signal, the vibration signal, and the pressure signal to obtain a denoised ultrasonic signal, a denoised vibration signal, and a denoised pressure signal, respectively;
    using a power amplifier to amplify the denoised ultrasonic signal, the denoised vibration signal, and the denoised pressure signal, and to discretize the denoised ultrasonic signal, the denoised vibration signal, and the denoised pressure signal to obtain a discretized ultrasonic signal, a discretized vibration signal, and a discretized pressure signal, respectively;

using a sampling signal with a magnitude twice a frequency of the ultrasonic signal to record the discretized ultrasonic signal as the discrete acoustic signal;

using a sampling signal with a magnitude twice a frequency of the vibration signal to record the discretized vibration signal as the discrete vibration signal; and using a sampling signal with a magnitude twice a frequency of the pressure signal to record the discretized pressure signal as the discrete pressure signal;

applying grid classification to the signal sampling points, and constructing grid distribution density based on results of the grid classification; determining a seed grid according to the grid distribution density, constructing a coverage density distance based on a core relative distance of the signal sampling points in the seed grid, and screening core points from all the signal sampling points based on the coverage density distance;

obtaining key-value pairs that correspond to the core points according to the core points and the coverage density distance, and obtaining classification results of data by utilizing a clustering algorithm;

wherein obtaining the key-value pairs that correspond to the core points according to the core points and the coverage density distance and obtaining the classification results of data by utilizing the clustering algorithm comprises:

obtaining the coverage density distance of each core point based on the core points, forming the key-value pairs by using each core point and the coverage density distance corresponding to the key-value pairs, and using the key-value pairs in an OPTICS clustering algorithm to obtain an ordered list decision map of data;

determining the qualified valve from the M assembled valves based on the ordered list decision map of data;

wherein determining the seed grid according to the grid distribution density comprises:

obtaining the grid distribution density of each grid, obtaining a segmentation threshold by using an Otsu algorithm, and determining a grid with the grid distribution density greater than the segmentation threshold as the seed grid;

wherein screening the core points from all the signal sampling points based on the coverage density distance comprises:

recording a maximum value of the coverage density distance as $C_{max}$, obtaining the signal sampling points that correspond to the maximum value of the coverage density distance in each grid, excluding the signal sampling points less than a screening threshold of $0.8C_{max}$, and taking remaining signal sampling points as the core points;

wherein applying the grid classification to the signal sampling points and constructing the grid distribution density based on the results of the grid classification comprises:

constructing the grid distribution density L for representing a magnitude of local density of the signal sampling points in each grid area, and calculating the grid distribution density $L_i$ of an i-th grid:

$$l_i = \frac{N(k_1(n_i) \cap k_2(g_i))}{N}$$

$$H = -\sum_{r=1}^{R} p(r)\log p(r)$$

$$L_i = \frac{l_i}{\bar{l}} \cdot H$$

wherein, $l_i$ is the grid distribution density of the i-th grid, N is a total number of grids where the signal sampling points exist, $n_i$ is a number of the signal sampling points in the i-th grid, $k_1(n_i)$ is a set of grids where the number of the signal sampling points is equal to $n_i$ in N grids $g_i$ is a distribution variance of amplitude values of the signal sampling points at each attribute in the i-th grid, $k_2(g_i)$ is the set of grids where the distribution variance of the amplitude values of the signal sampling points at each attribute is equal to $g_i$ in the N grids, $k_1(n_i) \cap k_2(g_i)$ is an intersection of the set of grids $k_1(n_i)$ and the set of grids $k_2(g_i)$, and $N(k_1(n_i) \cap k_2(g_i))$ is a number of grids in the intersection; H is information entropy of N grid distribution density levels; as the grid distribution density of all grids is calculated, grids with same grid distribution density share a distribution density level; a maximum value and a minimum value of the grid distribution density of the N grids are $l_{max}$ and $l_{min}$, respectively; wherein, a grid distribution density level corresponding to $l_{min}$ is recorded as a first level, the grid distribution density level corresponding to $l_{max}$ is recorded as an R-th level, $\rho(r)$ is a probability of an r-th level of the N grid distribution density levels, wherein the probability is equal to a ratio of the number of grids with the grid distribution density level r to the total number of grids N, and $\bar{l}$ is an average value of the grid distribution density of the N grids;

wherein constructing the coverage density distance comprises:

constructing the coverage density distance C for representing how far each data point in each seed grid is from becoming a non-core point, and calculating the coverage density distance $c_{ix}$ of a signal sampling point x in the seed grid i:

$$D_{xy} = \sum_{t=1}^{n_1} X(G, t) \cdot d(x_t, y_t)$$

$$\rho_{ix} = \frac{1}{n_2} \cdot \sum_{y=1}^{n_2} \frac{D_{max}(i)}{D_{xy} + \varphi_i}$$

$$c_{ix} = \frac{\rho_{ix} - \rho_{max}(i)}{\sum_{b=1}^{N} \rho_{ix} - \rho_{max}(b)}$$

$$C_{ix} = e^{-c_{ix}}$$

wherein, $D_{xy}$ is a grid distance between the signal sampling points x and y obtained based on information gain and the grid distribution density, $X(G, t)$ is the information gain of dimension t, G is a set of amplitude values of all dimensions of all signal sampling points, $n_1$ is a number of dimensions, $d(x_t, y_t)$ is an Euclidean distance between two signal sampling points on an amplitude value of a dimension t; $p_{ix}$ is a grid local density of the signal sampling point x, $n_2$ is the number of signal sampling points in the i-th grid, y is a y-th signal sampling point in the i-th grid, $D_{max(i)}$ is a maximum value of the grid distance in the i-th grid, $\varphi_1$ is a tuning factor, $C_{ix}$ is core relative distance of the signal sampling point x, N is the total number of grids where the signal sampling points exist, and $\rho_{max}(i)$ and $\rho_{max}(b)$ are maximum values of the grid local density in the i-th grid and a b-th grid, respectively.

2. A non-transitory computer-readable storage medium, on which a computer program is stored, wherein steps of the method according to claim 1 are realized when the computer program is executed.

3. A computer apparatus, which comprises a processor, a memory, and a computer program stored on the memory, wherein steps of the method according to claim 1 are realized when the processor executes the computer program.

\* \* \* \* \*